US009286103B2

(12) United States Patent
Acharya et al.

(10) Patent No.: US 9,286,103 B2
(45) Date of Patent: Mar. 15, 2016

(54) METHOD AND APPARATUS FOR PROVIDING A TEST NETWORK AS AN IP ACCESSIBLE CLOUD SERVICE

(75) Inventors: Arup Acharya, Nanuet, NY (US); Richard H. Boivie, Monroe, CT (US); William Cornejo, Woodhaven Queens, NY (US); Sean Donnellan, Gaestringen (DE)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 13/452,843

(22) Filed: Apr. 21, 2012

(65) Prior Publication Data
US 2013/0283265 A1    Oct. 24, 2013

(51) Int. Cl.
G06F 9/455    (2006.01)

(52) U.S. Cl.
CPC .. *G06F 9/45558* (2013.01); *G06F 2009/45562* (2013.01)

(58) Field of Classification Search
None
See application file for complete search history.

(56) References Cited

U.S. PATENT DOCUMENTS

| 7,886,077 | B2 | 2/2011 | Dudley et al. | |
|---|---|---|---|---|
| 8,117,289 | B1 * | 2/2012 | Miller et al. | 709/220 |
| 8,209,415 | B2 * | 6/2012 | Wei | 709/224 |
| 8,250,215 | B2 * | 8/2012 | Stienhans et al. | 709/227 |
| 8,656,023 | B1 * | 2/2014 | Ho et al. | 709/226 |
| 8,868,608 | B2 * | 10/2014 | Friedman et al. | 707/787 |
| 8,954,553 | B1 * | 2/2015 | Colton et al. | 709/223 |
| 2009/0086639 | A1 | 4/2009 | Krzanowski et al. | |
| 2010/0172302 | A1 | 7/2010 | Dunk | |
| 2010/0306765 | A1 * | 12/2010 | Dehaan | 718/1 |
| 2011/0055396 | A1 * | 3/2011 | Dehaan | 709/226 |
| 2011/0154101 | A1 | 6/2011 | Merwe et al. | |
| 2011/0161952 | A1 * | 6/2011 | Poddar et al. | 717/173 |
| 2011/0320598 | A1 * | 12/2011 | Solin | 709/225 |
| 2012/0030672 | A1 * | 2/2012 | Zygmuntowicz et al. | 718/1 |

OTHER PUBLICATIONS

Chen et al., "ShadowNet: a platform for rapid and safe network evolution", *Proceedings of the 2009 conference on USENIX Annual technical conference* (USENIX'09). USENIX Association, 2009, 14 pages.
Keller et al., "The 'Platform as a service' model for networking", *Proceedings of the 2010 internet network management conference on Research on enterprise networking* (INM/WREN'10), (USENIX Association), 2010, 6 pages.

* cited by examiner

*Primary Examiner* — Van Nguyen
(74) *Attorney, Agent, or Firm* — Louis J. Percello, Esq.; McGinn IP Law Group, PLLC (57) ABSTRACT

A method and structure for a cloud service includes an API (application programming interface) as tangibly embodied in a set of computer-executable instructions and selectively executable on a computer on a network. The API provides a user interface for a cloud environment comprising one or more virtual machines to be selectively instantiated on at least one computer in the network upon a user request. A library is accessible via the API, the library providing definitions of components available to be instantiated in the cloud environment. The API automatically instantiates an image of a virtual network of components, as defined by a user input request and provides at least one cloud portal providing the user an access to exercise the instantiated virtual network image.

19 Claims, 7 Drawing Sheets

METHOD AND APPARATUS FOR PROVIDING A TEST NETWORK AS AN IP ACCESSIBLE CLOUD SERVICE

BACKGROUND OF THE INVENTION

1. Field of the Invention

The present invention generally relates to transitions to new network protocols and, more specifically, in an exemplary embodiment, a network test environment is provided as a cloud service accessible via IPv4 to test new protocol and network configuration for IPv6 components and configurations.

2. Description of the Related Art

The Internet is currently based on the IPv4 protocol (Internet Protocol version 4). However, due to rapid adoption of the Internet, available address space in the IPv4 protocol has been depleted and the Internet needs to transition to IPv6 (Internet Protocol version 6).

IPv6 has a much larger address space, along with other additional capabilities. Thus, IPv6 and IPv4, although versions of the same protocol, have significant differences and all network and network-related components, whether servers, applications, storage, etc., that are network connected, need to be upgraded to IPv6 from IPv4. Additionally, the addressing structures in IPv6 are different, as are capabilities like mobility, multicasting and address auto-configuration.

The transition from IPv4 to IPv6 is expected to happen gradually. In a study by the present inventors, it is expected that an enterprise will need to spend about 6% of its annual IT (information technology) budget to transition to IPv6, over multiple years.

Typically, each network domain (e.g., enterprise, etc.) will first try to create an internal IPv6 sandbox to learn first-hand about this new technology by experimenting with its various capabilities. Doing this in a sandbox shields the customer's existing IPv4 network from the IPv6 testing.

The term "sandbox" has arisen recently as referring to an arena in which network specialists of an enterprise could "play in" for purpose of learning about IPv6 and testing their enterprise IPv6 components without having to actually implement these components on their existing network until they are deemed to function satisfactorily.

Businesses will typically begin the transition to IPv6 by setting up an internal sandbox/test network for the purpose of gaining experience, for testing application compliance and migration techniques, etc. Setting up such a test network requires the customer to, firstly, develop in-house IPv6 skills and, secondly, invest in procuring all the necessary IPv6 components that will comprise the test network.

The present invention provides a different approach, by providing an arena in which IPv6 components are available for customization without as much initial investment, so that users can become familiar with this new technology, including testing of IPv6 components and interconnections that may eventually be implemented by an enterprise outside the arena, as permanent components in an entity's existing network.

SUMMARY OF THE INVENTION

In view of the foregoing, and other, exemplary problems, drawbacks, and disadvantages of the conventional systems, it is an exemplary feature of the present invention to provide a structure (and method) in which these transition requirements are alleviated.

With the present invention, a customer does not have to set up a test IPv6 network on their own, and instead "rents" such a test network provided as a cloud service, as described herein.

Secondly, the present invention provides a method so that the initial IPv6 expertise needed is lower since a test network is set up and provided by someone else, as a cloud service, and a customer can build up their expertise over time.

Thirdly, with the present invention, a customer can decide to expand the test network "at will" by "renting out" additional capability as needed.

In a first exemplary aspect, the present invention provides a structure and method for a cloud service including an API (application programming interface) as tangibly embodied in a set of computer-executable instructions and selectively executable on a computer on a network, the API providing a user interface for a cloud environment comprising one or more virtual machines to be selectively instantiated on at least one computer in the network upon a user request; and a library accessible via the API, the library providing definitions of components available to be instantiated in the cloud environment, wherein the API automatically instantiates an image of a virtual network of components as defined by a user input request and provides at least one cloud portal that provides the user an access to exercise the instantiated virtual network image.

In a second exemplary aspect, also described herein is an apparatus, including at least one processor to execute a set of machine-readable instructions; a memory device to store sets of instructions for execution on the at least one processor; and a port to receive instructions from a user and transmit results to the user, wherein a set of instructions stored on the memory device comprises instructions: to permit the user to select network components from a library of standard network components and to define interconnections and settings of the selected network components, to thereby define a desired virtual network; to automatically instantiate the desired virtual network as an image being executed by one or more virtual machines in a cloud environment; and to permit the user to exercise the instantiated desired virtual network image.

In a third exemplary aspect, also described herein is a method of providing a cloud service, including receiving a user request via a network input port on a computer to set up a virtual network image to be executed on one or more virtual machines; invoking an API (application programming interface) that provides a user interface for the user request, the API providing a set of network components selectable by the user for the virtual network image; receiving an input description from the user that defines a desired virtual network image, including user-selected network components and associated interconnections and settings; and automatically instantiating the defined virtual network image on one or more virtual machines.

In a fourth exemplary aspect, also described herein is a non-transitory, computer-readable storage medium tangibly embodying a program of machine-readable instructions executable by a digital processing apparatus to perform a method of providing a cloud service described herein.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-7, exemplary embodiments of the method and structures according to the present invention will now be described.

Before explaining the mechanism of the present invention, it will be useful to understand cloud computing platforms, the environment used to implement the present invention.

As known in the art, a cloud computing platform, such as demonstrated by the Amazon Elastic Compute Cloud (EC2) ®, allows users to rent virtual computers on which to run their own computer applications. EC2 thereby allows a scalable deployment of applications by providing a Web service through which a user can boot an Amazon Machine Image to create a virtual machine, which Amazon calls an "instance", containing any software desired.

A user can create, launch, and terminate server instances as desired, paying by the hour for active servers, thereby explaining the term "elastic." EC2 also provides users with control over the geographical location of instances that allows for latency optimization and high levels of redundancy.

EC2 uses Xen virtualization, in which each virtual machine (e.g., "instance") functions as a virtual private server. Different operating systems are available for the EC2 service, including Linux, Sun Microsystems' OpenSolaris® and Solaris Express® Community Edition, Windows Server 2003®, Windows Server 2008®, FreeBSD®, and NetBSD® operating systems.

In contrast to offering cloud computing, such as available through EC2, wherein computing capability is available to a user on a network of virtual machines, the present invention provides a cloud service, in which virtual machines are available for users to set up a sandbox for a new technology such as the transition to IPv6. In an exemplary embodiment, such service is offered on a "pay-as-you-go" basis, thereby reducing the user's initial investment in components and technical expertise, since the new technology components available on the cloud service would be designed by someone already having expertise in the new technology. The cloud service would make available to the user a standard library of new technology (e.g., IPv6) components, from which the user would select instantiations of components to be interconnected as requested, thereby providing a an environment for testing that is customized by each user.

As an initial matter, it is noted that the cloud service of the present invention can be implemented either on an existing cloud environment, such as EC2, or the invocation of the cloud service could set up a new cloud environment, using virtual machines on any computer or network. In a typical scenario, the user would contact a network server having the IPv6 library and interface described below, for purpose of setting up a virtual network consisting of a desired instantiation of interconnected virtual IPv6 components for testing.

Figure 1:
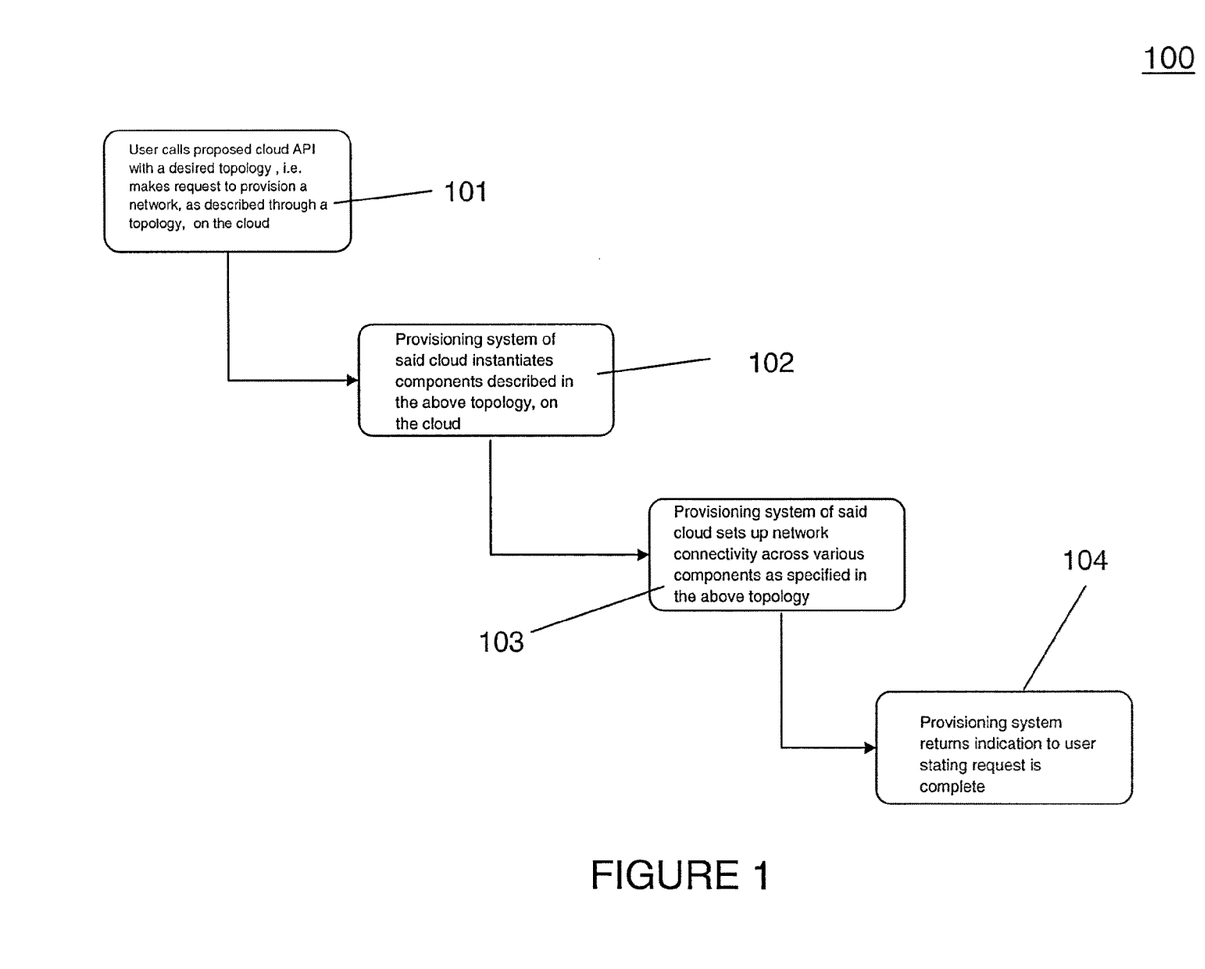
FIG. 1 provides, in flowchart format 100, concepts of an exemplary embodiment for a cloud service, as exemplarily implemented for IPv6 technology.

Returning now to the present invention, FIG. 1 shows the method of an exemplary embodiment as demonstrated for IPv6, although, as mentioned above, the cloud service of the present invention could be similarly implemented for any new technology for which a library of standard components could be developed for users to instantiate in a desired customized interconnectivity. In step 101 of flowchart 100 in FIG. 1, a user initially logs onto the cloud service and defines a desired IPv6 network topology, including network components, applications, and connectivity. Access to a cloud service typically would involve contacting a server on the Internet that is configured to make available the cloud service.

In step 102 the user invokes the cloud service mechanism, such as an "application program interface" (API), that permits the user to make a request for the API to provision and implement a virtual network as described by the user's request, using instantiations of components that are selectable from a library of available components that have been previously designed for the new technology.

In step 103, the cloud service API automatically instantiates the user's requested IPv6 network topology, using the user's requested IPv6 components. Similar to the explanation above for the Amazon EC2 cloud service, this step might involve placing the user's desired virtual network instantiation on an existing cloud platform, such as EC2. But the virtual network instantiation could alternatively involve a physical machine, typically a server, that will instantiate a cloud platform by generating one or more virtual machines that implement the IPv6 components requested by the user's input definition.

The precise details of the IPv6 virtual network instantiation are not important in this discussion, since instantiation of virtual machines and components in the cloud environment is well known in the art. What is noted is that the library of virtual machines available for a customer using the present invention will be predetermined in configuration. Thus, for example, one possible virtual machine might be preconfigured to emulate a server, while another possible virtual machine might be preconfigured to emulate a router, while another possible virtual machine might be preconfigured to emulate a server connected to a router, etc.

In step 103, the cloud service API also automatically sets up the network connectivity requested by the user, thereby mapping the user's requested configuration to the virtual components operating on the virtual machine instantiated in step 103 and in step 104, the cloud service advises the user that the requested IPv6 network is available.

Thus, in this exemplary embodiment for IPv6 experimentation, the present invention offers a multi-tenant service, where customers can request an IPv6 network to be provisioned and can access the provisioned instance through IPv4, permitting customers to try out applications in the IPv6 setting without having to deploy an IPv6 network of their own. As the customer becomes comfortable with the new technology, the customer will begin implementing their own IPv6 transition in their own network.

Figure 2:
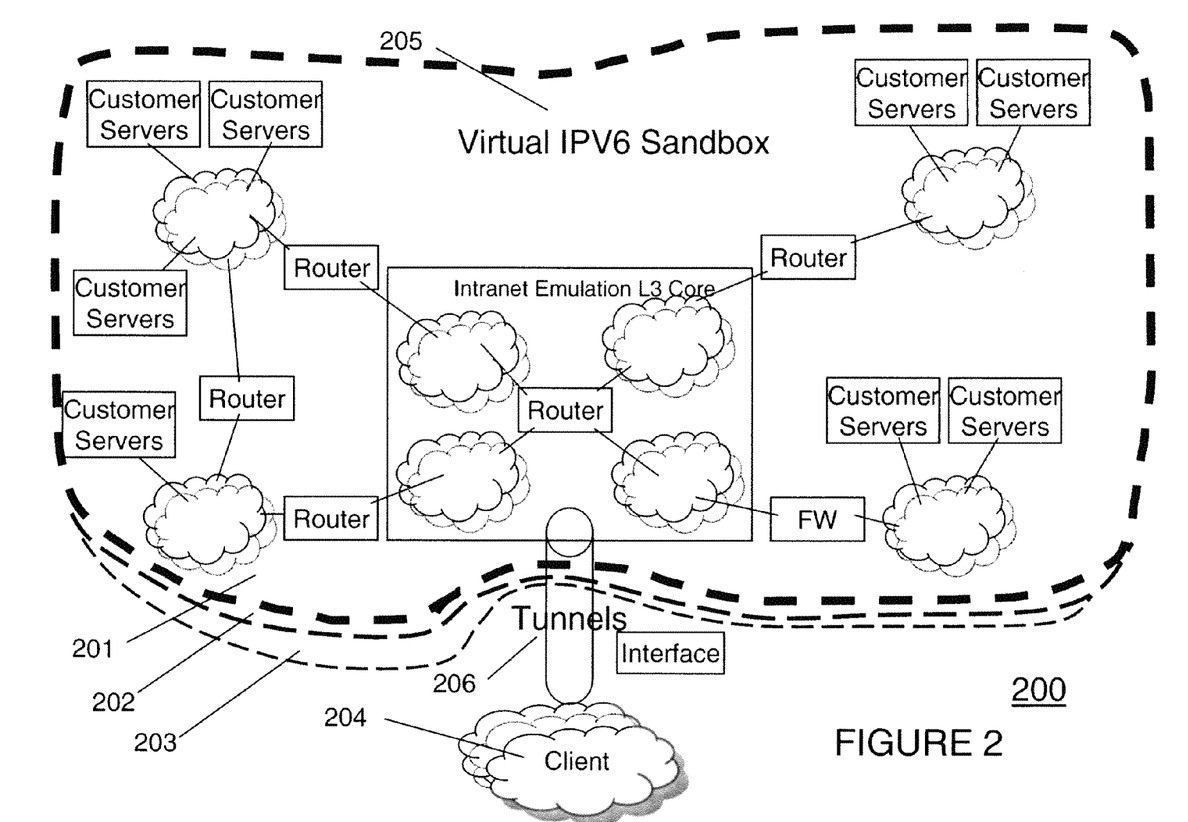
FIG. 2 shows a diagram 200 of an exemplary cloud instantiation of a configuration requested by a user.

From the description of FIG. 1, it can be seen that the present invention offers networking as a cloud service to users, as distinguished from conventional cloud services offering computing services in the cloud. For purpose of illustration, FIG. 2 shows an exemplary high level overview 200 of the IPv6 test and development cloud mechanism. Each dashed line bubble 201, 202, 203 represents an instantiation of a network requested by a user 204. Each instantiation 201, 202, 203 thereby provides a different virtual IPv6 sandbox 205 for the user 204, as available to the user 204 via tunnels 206 that would provide the user access to "play in" the sandbox.

It should be clear that any number of IPv6 components, e.g., servers, routers, firewalls, etc., can be included in an instantiation and interconnected in any number of ways, such as indicated exemplarily by the interconnections in FIG. 2, which exemplarily include unspecified network infrastructure indicated by the "clouds" in this diagram. As described in the flowchart 100 of FIG. 1, the API of the present invention receives the user's requested network and automatically instantiates this network as IPv6 components retrieved from a library of pre-prepared components, and automatically interconnects the components as requested. Although FIG. 2 shows exemplarily a collection of interconnected networked components including servers, routers, and firewall, it should be clear to one having ordinary skill in the art that other components are possible, including applications, storage, network appliances, intrusion detection systems, and intrusion prevention systems, etc. Other examples of network components might include network support services such as DNS (Domain Name Server) or DHCP (Dynamic Host Configuration Protocol) servers.

Exemplary Software Implementation

Figure 3:
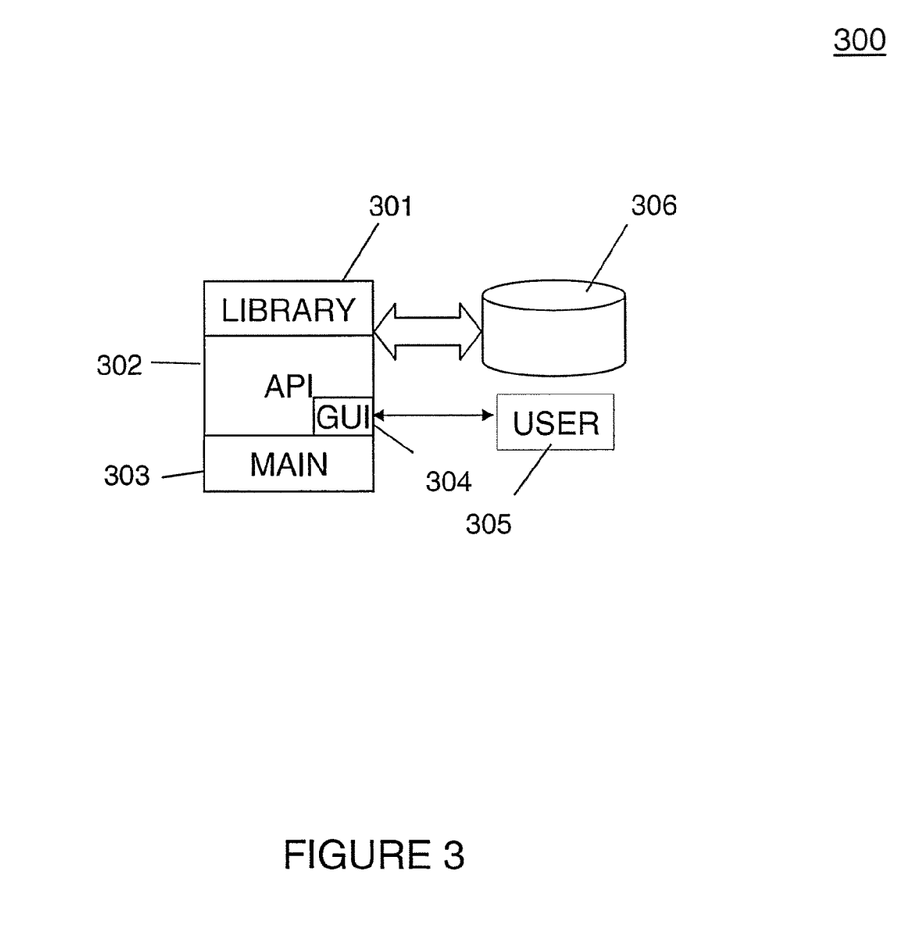
FIG. 3 shows an exemplary block diagram 300 of an embodiment of the present invention.

FIG. 3 shows an exemplary block diagram 300 of a computer program for implementing the cloud service of the present invention, including a library module 301 of possible network components that could be selected, Application Programming Interface (API) 302, which provides the interface to the routines, data structures, object classes, and variables in the main module 303 implementing the cloud service. The API 302 includes a user interface 304 that provides a Graphical User Interface (GUI) for interfacing with cloud service customers 305. Library module 301 could itself have defined therein the data for the standard network components available to be instantiated by the user 305, or might interface with an external storage 306 for such data. Additionally, external storage 306 would store data for each user virtual network instantiation.

Figure 4:
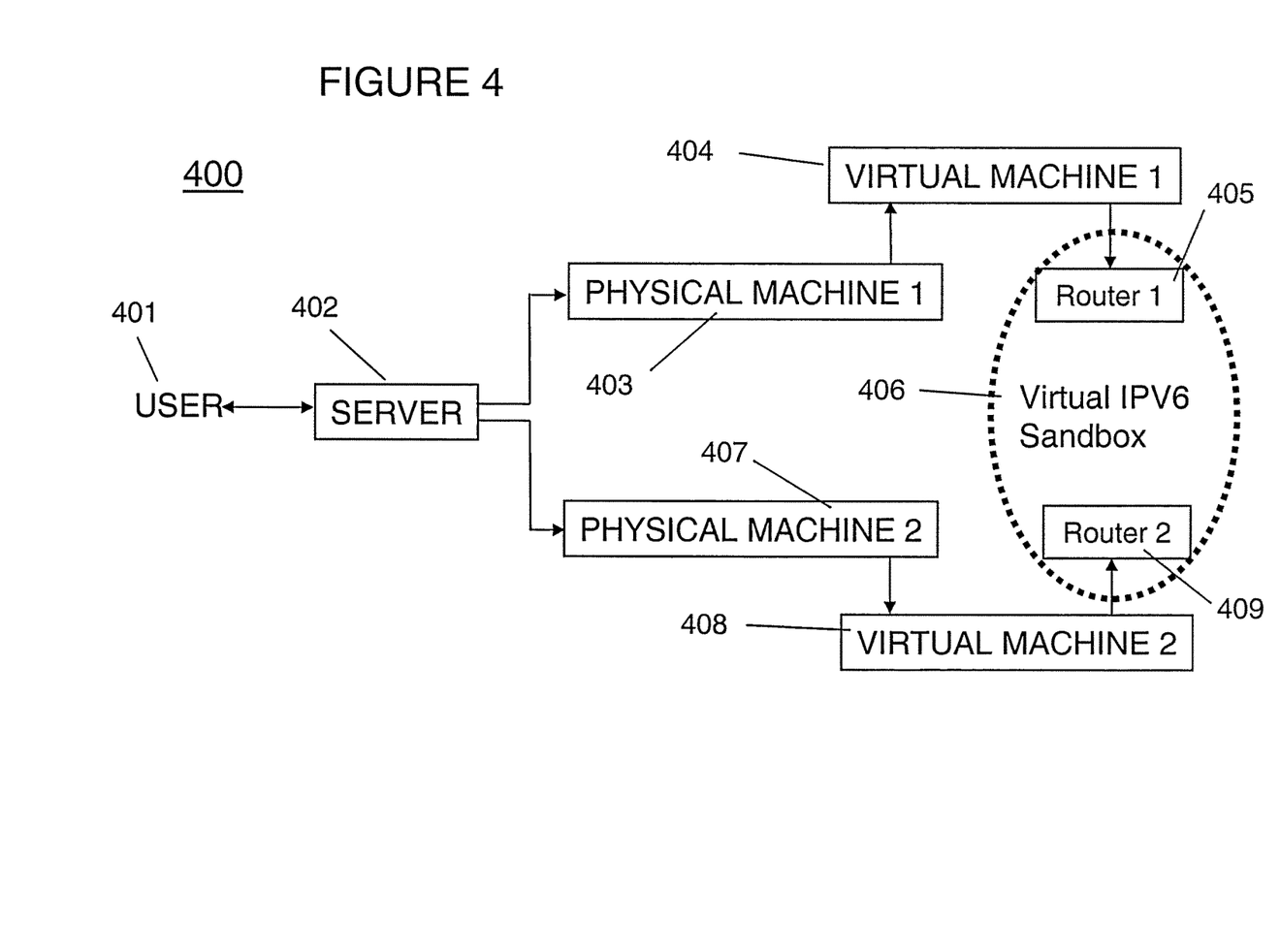
FIG. 4 illustrates an exemplary configuration 400 that demonstrates a possible implementation of the concepts of the present invention for a sandbox with two IPv6 routers.

FIG. 4 shows an exemplary configuration 400 that demonstrates the concepts described above, with more details. User (e.g., a client) 401 contacts a server 402 on a network that provides the cloud service of the present invention, for purpose of initiating a cloud service session, demonstrated exemplarily as involving two IPv6 routers 405, 409. Upon defining the topology of the desired sandbox configuration, as explained in FIG. 1, the cloud service API will have the server 402 contact two physical machines 403, 407 to respectively instantiate two virtual machines 404, 408, one virtual machine per IPv6 component 405, 409, thereby creating the sandbox 406.

Although not expressly indicated in FIG. 4, the two routers 405, 409 could be interconnected to provide a network of components. It is noted that, although FIG. 4 exemplarily shows a single IPv6 component 405, 409 respectively instantiated by each virtual machine 404, 408, the virtual machines 404, 408 can respectively instantiate a plurality of IPv6 components.

That is, although machine 402 might be a physical, separate provisioning server/portal server to accept user requests for the physical machines 403, 407, there is no restriction that multiple physical machines be used. One could place multiple virtual machines on a physical machine and one virtual machine could have multiple IPv6 functions built into them.

Figure 5:
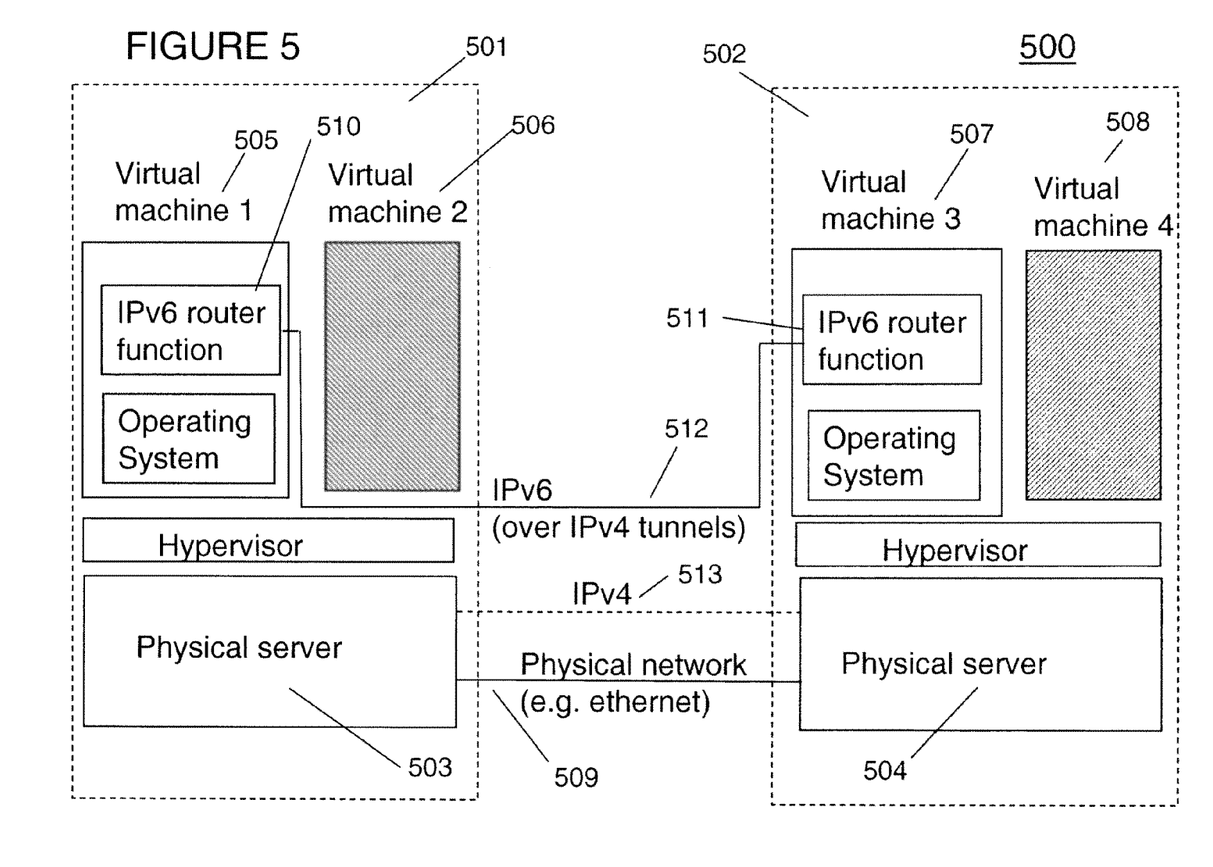
FIG. 5 illustrates details 500 on how two exemplary IPv6 routers might be implemented in a sandbox.

FIG. 5 shows more details 500 for the sandbox exemplarily involving two IPv6 routers, as shown in respective dashed boxes 501, 502. In this configuration, the two physical machines 503, 504 are physical servers, each having a hypervisor, each hypervisor supervising operation of a plurality of operating systems.

Four virtual machines (VMs) 505, 506, 507, 508 are demonstrated as instantiated on these two physical servers 503, 504, two VMs 505, 506 being executed on server 503 and two VMs 507, 508 being executed on server 504. Although each server 503, 504 is shown with two VMs currently executing, the two shaded VMs 506, 508 are not involved in the current sandbox.

Thus, VM1 and VM3 505, 507 are providing the sandbox with two IPv6 routers. The two physical machines 503, 504 are interconnected on the physical layer 509 using, for example, Ethernet. The VMs 505, 507, each have an IPv6 router function 510, 511 each having been created from a v6 router image from a library of images. The two v6 router VMs 510, 511 are connected through a v6 logical link 512, created as an IPv6 over IPv4 tunnel, meaning that the IPv6 link resides on the IPv4 foundation 509.

From this exemplary configuration 500, it should now be clear to one having ordinary skill in the art that, given a topology of various v6 components and interconnections, one could instantiate a VM for each component (from the library of possible components) and connect the VMs in accordance with the topology, as exemplarily illustrated in FIG. 5.

Although only one logical link 512 is shown in FIG. 5, it would be clear to one having ordinary skill in the art that any arbitrary topology can be obtained by creating such links repeatedly between relevant VMs, thereby any desired IPv6 topology can be similarly instantiated.

It is also noted that the user interacts (e.g., exercises) the components in the sandbox by interacting with the virtual machines. That is, the user could specify a topology, such as shown in FIG. 2. This topology gets mapped by the provisioning server into a series of IPv6 virtual nodes and virtual links, as shown in FIG. 5. The links get exercised, meaning that they are used to route IPv6 packets between IPv6 components, e.g. when a user logs into a virtual machine running a web browser and sends a web request to the web server of the same topology, the web request would generate a series of IPv6 packets in the case of the exemplary embodiment described in FIG. 5.

Exemplary Hardware Implementation

Figure 6:
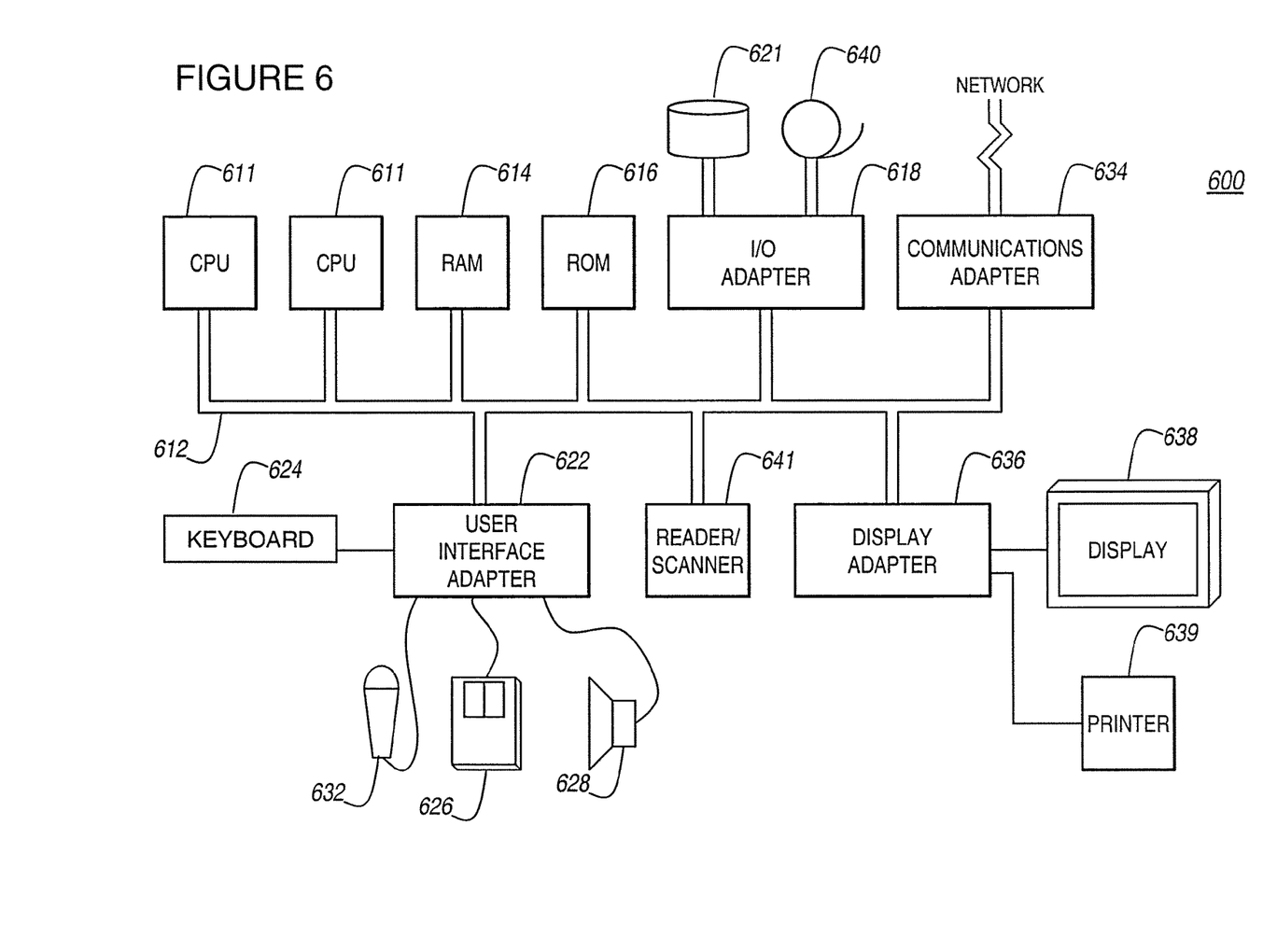
FIG. 6 illustrates an exemplary hardware/information handling system 600 for implementing the present invention therein.

FIG. 6 illustrates a typical hardware configuration of an information handling/computer system in accordance with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing storage media.

Thus, this aspect of the present invention is directed to a programmed product, comprising signal-bearing storage media tangibly embodying a program of machine-readable instructions executable by a digital data processor incorporating the CPU 611 and hardware above, to perform the method of the invention. In this context, "signal-bearing" describes that the stored instruction has a functional aspect such that an electronic device can sense the instruction information on the signal-bearing storage medium.

This signal-bearing storage media may include, for example, a RAM 614 contained within the CPU 611, as represented by the fast-access storage for example. Alternatively, the instructions may be contained in another signal-bearing storage media, such as a magnetic data storage diskette 700 (FIG. 7), directly or indirectly accessible by the CPU 611.

Figure 7:
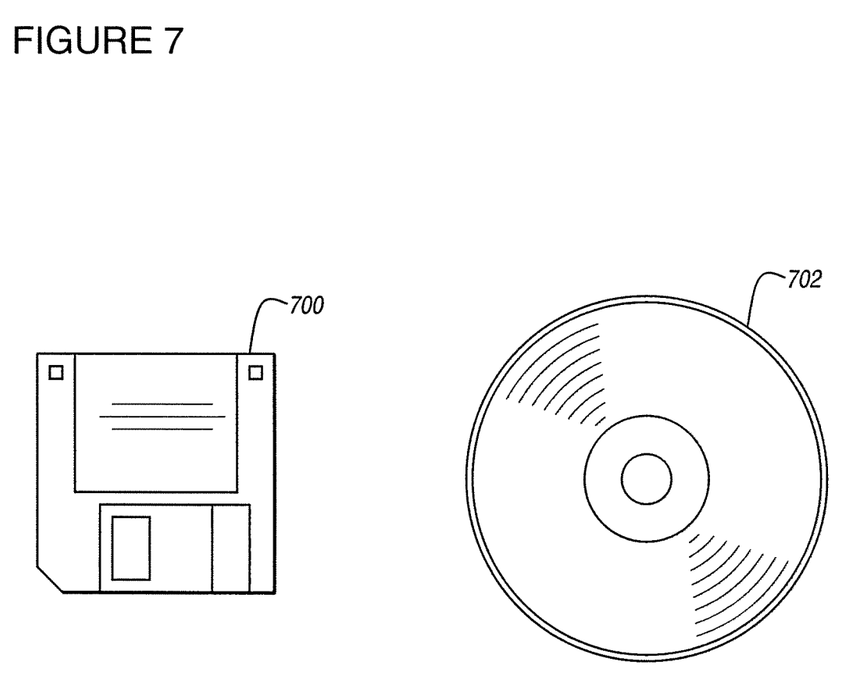
FIG. 7 illustrates a signal bearing storage medium 700 (e.g., storage medium) for storing steps of a program of a method according to the present invention.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM 702, WORM, DVD, digital optical tape, etc.), paper "punch" cards, or other suitable signal-bearing storage media including memory devices in transmission hardware, communication links, and wireless, and including different formats such as digital and analog. In an illustrative embodiment of the invention, the machine-readable instructions may comprise software object code.

It is again noted that, for purpose of explaining the concepts of the present invention, an exemplary embodiment uses the IPv6 transition to explain the concepts of the invention. However, the concepts of this invention can also be applied to offer a complete networking system as a cloud service for other technology testing.

For example, for an enterprise wishing to test out a set of new networking components (e.g., router upgrades), the set of related upgrades can be bundled as an operational system and offered as a service from the cloud. Thus, the present invention is not intended as directed simply to providing a cloud service for IPv6 transition, but is intended as directed to the more general technique of providing a cloud service for learning, experimenting with, and testing new networked technologies. One of ordinary skill in the art would readily understand that the cloud service mechanism of the present invention could be used for any new technology, or even any current technology, for which components can be pre-prepared and stored in a library for instantiation in a cloud environment.

Thus, while the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A computer system including at least one processor for providing a cloud service for testing and experimenting with components of a user-specified Internet Protocol (IP) specification, the computer infrastructure comprising:

an API (application programming interface) as tangibly embodied in a set of computer-executable instructions on a computer on a network, said API providing a user interface for a cloud environment comprising one or more virtual machines to be selectively instantiated on at least one computer in said network based upon a user request; and a storage device comprising a library accessible via said API, said library providing definitions of components available to be instantiated in said cloud environment in an Internet Protocol (IP) specification selected by the user using said API, wherein said API automatically instantiates an image of a virtual network of components of the user-selected IP specification, as the virtual network has been defined by a user input request, and provides at least one cloud portal providing said user an access to exercise said instantiated virtual network image for testing and experimentation by the user of the virtual network configuration and components in the user-selected IP specification.

2. The computer system of claim 1, wherein said components comprise one or more of: an application; a server; a storage; a network router; a firewall; a network appliance; an intrusion detection system; and an intrusion prevention system.

3. The computer system of claim 2, as comprising a library of components having at least one of:

IPv6 (Internet Protocol version 6) characteristics; and
IPv4 (Internet Protocol version 4) characteristics.

4. The computer system of claim 3, as providing access to an IPv6 test system for users with IPv4-only access, where said IPv6 test system comprises a selectively-implemented collection of user-defined IPv6 components and said at least one cloud portal permits the user to use its IPv4-only access to experiment with the collection of IPv6 components.

5. The computer system of claim 4, wherein said IPv6 system is maintained as a composite virtualized image that is instantiated/provisioned on a per- demand basis.

6. The computer system of claim 3, wherein, when once instantiated, said IPv6 system provides a working and pre-configured environment to test and experiment with IPv6 systems for customers that have only IPv4 capabilities.

7. The computer infrastructure system of claim 4, wherein said collection of IPv6 components that a user can selectively implement comprises one or more of applications, servers, storage, network routers, and network support services including DNS (Domain Name Server) and DHCP (Dynamic Host Configuration Protocol) servers.

8. The computer system of claim 3, wherein an access to said IPv6 system is provided by one of IP4 & IPv6 dual-stacked terminal servers or IPv4/IPv6 gateways.

9. The computer system of claim 1, further comprising at least one computer configured to instantiate said one or more virtual machines that implement said cloud environment.

10. The computer system of claim 1, as implemented on an existing computer cloud.

11. The computer system of claim 1, as implemented on at least one virtual machine, as initially set up upon request on a computer to execute an instantiation of the cloud service.

12. The computer system of claim 1, wherein said image is user customizable.

13. The computer system of claim 1, wherein each said at least one cloud portal comprises a tunnel between the API and a user-specified point in said virtual network image.

14. An apparatus, comprising:
   at least one processor to execute a set of machine-readable instructions;
   a memory device to store sets of instructions for execution on said at least one processor; and
   a port to receive instructions from a user and transmit results to said user,
   wherein a set of instructions stored on said memory device comprises instructions:
      to permit said user to select an Internet Protocol (IP) specification;
      to permit said user to select network components from a library of standard network components and to define interconnections and settings of said selected network components, to thereby define a desired virtual network in the selected IP specification;
      to automatically instantiate said desired virtual network as an image being executed by one or more virtual machines in a cloud environment; and
      to permit said user to exercise and experiment with said instantiated desired virtual network image.

15. The apparatus of claim 14, wherein said desired virtual network image comprises at least one network component that uses Internet Protocol version 6 (IPv6).

16. A method of providing a cloud service, said method comprising:
   receiving a user request via a network input port on a computer to set up a virtual network image to be executed on one or more virtual machines;
   invoking an API (application programming interface) that provides a user interface for said user request, said API providing a set of network components selectable by said user for said virtual network image;
   receiving input from said user that defines a desired virtual network image, including user-selected network components of a user-selected Internet Protocol (IP) specification and associated interconnections and settings;
   instantiating the defined virtual network image on one or more virtual machines; transmitting to said user an indication that said instantiation of said defined virtual network image is complete; and
   permitting said user to exercise and experiment with said instantiated virtual network image.

17. The method of claim 16, wherein said defined virtual network image comprises at least one network component that uses IPv6 (Internet Protocol version 6).

18. A non-transitory, computer-readable storage medium tangibly embodying a program of machine-readable instructions executable by a digital processing apparatus to perform a method of providing a cloud service, said method comprising:
   receiving a request from a user via a network input port on a computer to set up a virtual network image to be executed on one or more virtual machines;
   invoking an API (application programming interface) that provides a user interface for said request from a user, said API providing a set of network components selectable by said user for said virtual network image;
   receiving an input description from said user that defines a desired virtual network image in a user-selected Internet Protocol (IP) specification, including user-selected network components and associated interconnections and settings; and
   automatically instantiating the defined virtual network image on one or more virtual machines.

19. The storage medium of claim 18, as embodied in one of:
   a memory device on a computer, as currently executing said method;
   a memory device on a computer, as storing said method to be selectively executed upon an input request;
   a memory device accessible via a network, as storing said method to be selectively executed upon an input request; and
   a standalone memory device, as storing said instructions and intended to be inserted into a computer input device to upload said instructions into a computer memory.

* * * * *